(12) United States Patent
Qin et al.

(10) Patent No.: US 11,138,888 B2
(45) Date of Patent: Oct. 5, 2021

(54) SYSTEM AND METHOD FOR RIDE ORDER DISPATCHING

(71) Applicant: Beijing DiDi Infinity Technology and Development Co., Ltd., Beijing (CN)

(72) Inventors: Zhiwei Qin, San Jose, CA (US); Fei Feng, Cupertino, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 210 days.

(21) Appl. No.: 16/219,753

(22) Filed: Dec. 13, 2018

(65) Prior Publication Data

US 2020/0193834 A1 Jun. 18, 2020

(51) Int. Cl.
*G08G 1/00* (2006.01)
*G06Q 10/02* (2012.01)
*G06N 7/00* (2006.01)
*G01C 21/34* (2006.01)
*G06Q 10/04* (2012.01)
*G06Q 50/30* (2012.01)

(52) U.S. Cl.
CPC ......... *G08G 1/202* (2013.01); *G01C 21/3438* (2013.01); *G06N 7/005* (2013.01); *G06Q 10/02* (2013.01); *G06Q 10/047* (2013.01); *G06Q 50/30* (2013.01)

(58) Field of Classification Search
CPC ............................ G08G 1/202; G01C 21/3438
See application file for complete search history.

(56) References Cited

U.S. PATENT DOCUMENTS

| | | | |
|---|---|---|---|
| 2018/0046961 A1* | 2/2018 | Tulabandhula | G08G 1/202 |
| 2018/0330178 A1* | 11/2018 | el Kaliouby | B60W 50/082 |
| 2019/0146484 A1* | 5/2019 | Lin | H04W 12/06 |
| | | | 701/2 |

FOREIGN PATENT DOCUMENTS

CN 108594804 A 9/2018

OTHER PUBLICATIONS

Zeyuan Allen-Zhu. Katyusha x: Practical momentum method for stochastic sum-of-nonconvex optimization. arXiv preprint arXiv:1802.03866, 2018.

(Continued)

*Primary Examiner* — Jess Whittington
(74) *Attorney, Agent, or Firm* — Sheppard Mullin Richter & Hampton LLP

(57) ABSTRACT

A method for ride order dispatching comprises: obtaining a current location of a current vehicle from a computing device associated with the current vehicle; obtaining a current list of available orders nearby based on the current location; feeding the current location, the current list of available orders nearby, and a current time to a trained Markov Decision Process (MDP) model to obtain action information, the action information being repositioning the current vehicle to another current location or completing a current ride order by the current vehicle; and transmitting the generated action information to the computing device to cause the current vehicle to reposition to the another current location, stay at the current location, or accept the current ride order by proceeding to a pick-up location of the current ride order.

11 Claims, 7 Drawing Sheets

(56) References Cited

OTHER PUBLICATIONS

Chonghai Hu, Weike Pan, and James T Kwok. Accelerated gradient methods for stochastic optimization and online learning. In Advances in Neural Information Processing Systems, pp. 781-789, 2009.
Martin L Puterman. Markov decision processes: discrete stochastic dynamic programming. John Wiley & Sons, 2014.
Sashank J Reddi, Suvrit Sra, Barnabas Poczos, and Alex Smola. Fast stochastic methods for nonsmooth nonconvex optimization. arXiv preprint arXiv:1605.06900, 2016.
Mengdi Wang, Ethan X Fang, and Han Liu. Stochastic compositional gradient descent: algorithms for minimizing compositions of expected-value functions. Mathematical Programming, 161(1-2):419-449, 2017.
PCT International Search Report and the Written Opinion dated Apr. 24, 2019, issued in related International Application No. PCT/US2018/068127 (13 pages).
Lin, K., et al. Efficient Large-Scale Fleet Management via Multi-Agent Deep Reinforcement Learning. Proceedings of the 24th ACM SIGKDD International Conference on Knowledge Discovery & Data Mining KDD '18, Aug. 23, 2018, pp. 1774-1783.
Ulmer et al., "Route-Based Markov Decision Processed for Dynamic Vehicle Routing Problems", May 2, 2017.
Wang, Z., et al., "Deep Reinforcement Learning with Knowledge Transfer for Online Rides Order Dispatching", 2018 IEEE International Conference on Data Mining (ICDM), Nov. 17, 2018, pp. 617-626.
Xu, Z., et al., Large-Scale Order Dispatch in On-Demand Ride-Hailing Platforms: a Learning and Planning Approach. Proceedings of the 24th ACM SIGKDD International Conference on Knowledge Discovery & Data Mining KDD '18, Aug. 23, 2018, pp. 905-913.

* cited by examiner

400

402: obtaining a current location of a current vehicle from a computing device associated with the current vehicle

403: obtaining a current list of available orders nearby based on the current location

404: feeding the current location, the current list of available orders nearby, and a current time to a trained Markov Decision Process (MDP) model to obtain action information, the action information being repositioning the current vehicle to another current location or completing a current ride order by the current vehicle

405: transmitting the generated action information to the computing device to cause the current vehicle to reposition to the another current location, stay at the current location, or accept the current ride order by proceeding to a pick-up location of the current ride order

FIG. 4A

SYSTEM AND METHOD FOR RIDE ORDER DISPATCHING

TECHNICAL FIELD

This disclosure generally relates to methods and devices for ride order dispatching.

BACKGROUND

A vehicle dispatch platform can automatically allocate transportation requests to corresponding vehicles for providing transportation services and reward the drivers. However, it has been challenging to determine a ride order dispatching method that maximizes the gain for each vehicle driver.

SUMMARY

Various embodiments of the present disclosure include systems, methods, and non-transitory computer readable media for ride order dispatching.

According to one aspect, a computer-implemented method for ride order dispatching comprises: obtaining a current location of a current vehicle from a computing device associated with the current vehicle, obtaining a current list of available orders nearby based on the current location, feeding the current location, the current list of available orders nearby, and a current time to a trained Markov Decision Process (MDP) model to obtain action information, the action information being repositioning the current vehicle to another current location or completing a current ride order by the current vehicle, and transmitting the generated action information to the computing device to cause the current vehicle to reposition to the another current location, stay at the current location, or accept the current ride order by proceeding to a pick-up location of the current ride order.

The MDP model is trained based on a plurality of historical or simulated vehicle trips under a policy of maximizing a cumulative reward for a training vehicle completing the historical or simulated vehicle trips. The MDP model discretizes a region into repeating zones and a time period into time slots. Each state of the MDP model comprises: a time represented by a time lot index, a location represented by a repeating zone index, and a list of available orders nearby represented by repeating zone indices of destinations of the available orders nearby. Each action of the MDP model comprises: completing one of the available orders nearby from the list, repositioning to another location, or staying at the location. If the training vehicle completes one of the available orders nearby from the list, the training vehicle gets a fare for completing the one available order nearby as the reward, and the state transitions to a next state comprising: a next time corresponding to completion of the one available order nearby, a next location corresponding a destination of the one available order nearby, and a next list of available orders nearby corresponding the next location. If the training vehicle repositions to the another location, the training vehicle gets no reward, and the state transitions to a next state comprising: a next time corresponding to reaching the another location, the another location, and a next list of available orders nearby corresponding the another location. If the training vehicle stays at the location, the training vehicle gets no reward, and the state transitions to a next state comprising: the time, the location, and the list of available orders nearby.

In some embodiments, for training the MDP model, the location and pick-up locations of the available orders nearby are in a same repeating zone. For application of the trained MDP model, the current location and a pick-up location of the current ride order are within a same repeating zone.

In some embodiments, for training the MDP model, all orders with pick-up locations in a repeating zone corresponding to the location are divided averagely and randomly among all vehicles in the repeating zone corresponding to the location to obtain the list of available orders nearby for the training vehicle. For application of the trained MDP model, all current orders with pick-up locations in a repeating zone corresponding to the current location are divided averagely and randomly among all current vehicles in the repeating zone corresponding to the current location to obtain the current list of available orders nearby for the current vehicle.

In some embodiments, for training the MDP model, the list of available orders nearby for the training vehicle is a ceiling function of a division of the all orders with pick-up locations in the repeating zone corresponding to the location by the all vehicles in the repeating zone corresponding to the location. For application of the trained MDP model, the current list of available orders nearby for the current vehicle is a ceiling function of a division of the all current orders with pick-up locations in the repeating zone corresponding to the current location by the all current vehicles in the repeating zone corresponding to the current location to obtain.

According to another aspect, a computer-implemented method for ride order dispatching comprises: obtaining a current location of a current vehicle from a computing device associated with the current vehicle, obtaining a current number of available orders nearby in a current list based on the current location, feeding the current location, the current number of available orders nearby, and a current time to a solved Markov Decision Process (MDP) model to obtain action information, the action information being repositioning the current vehicle to another current location or completing a current ride order by the current vehicle, and transmitting the generated action information to the computing device to cause the current vehicle to reposition to the another current location, stay at the current location, or accept the current ride order by proceeding to a pick-up location of the current ride order.

The MDP model is solved based on a plurality of historical or simulated vehicle trips under a policy of maximizing a cumulative reward for a hypothetical vehicle completing the historical or simulated vehicle trips. The MDP model discretizes a region into repeating zones and a time period into time slots. Each state of the MDP model comprises: a time represented by a time lot index, a location represented by a repeating zone index, and a number of available orders nearby in a list, the available orders nearby represented by repeating zone indices of destinations of the available orders nearby. Each action of the MDP model comprises: completing one of the available orders nearby from the list, repositioning to another location, or staying at the location. If the hypothetical vehicle completes one of the available orders nearby from the list, the hypothetical vehicle gets a fare for completing the one available order nearby as the reward, and the state transitions to a next state comprising: a next time corresponding to completion of the one available order nearby, a next location corresponding a destination of the one available order nearby, and a next number of available orders nearby in a next list corresponding the next location. If the hypothetical vehicle repositions to the another location, the hypothetical vehicle gets no reward, and the state transitions to a next state comprising: a next time corresponding to reaching the another location, the another location, and a next number of available orders nearby in a next list corresponding the another location. If the hypothetical vehicle stays at the location, the hypothetical vehicle gets no reward, and the state transitions to a next state comprising: the time, the location, and the number of available orders nearby in the list.

In some embodiments, for solving the MDP model, the location and pick-up locations of the available orders nearby are in a same repeating zone. For application of the solved MDP model, the current location and a pick-up location of the current ride order are within a same repeating zone.

In some embodiments, for solving the MDP model, all orders with pick-up locations in a repeating zone corresponding to the location are divided averagely and randomly among all vehicles in the repeating zone corresponding to the location to obtain the number of available orders nearby for the hypothetical vehicle. For application of the solved MDP model, all current orders with pick-up locations in a repeating zone corresponding to the current location are divided averagely and randomly among all current vehicles in the repeating zone corresponding to the current location to obtain the current number of available orders nearby for the current vehicle.

In some embodiments, for solving the MDP model, the number of available orders nearby for the hypothetical vehicle is a ceiling function of a division of the all orders with pick-up locations in the repeating zone corresponding to the location by the all vehicles in the repeating zone corresponding to the location. For application of the solved MDP model, the current number of available orders nearby for the current vehicle is a ceiling function of a division of the all current orders with pick-up locations in the repeating zone corresponding to the current location by the all current vehicles in the repeating zone corresponding to the current location to obtain.

In some embodiments, solving the MDP model comprises solving the MDP model based on applying acceleration and variance reduction algorithms to tabular implementation. In some embodiments, solving the MDP model based on the plurality of historical or simulated vehicle trips comprises: obtaining data for each of the historical vehicle trips, the data comprising: a historical pick-up time, a historical pick-up location, a historical drop-off time, and a historical drop-off location, training a random forest classifier with the historical pick-up time, the historical pick-up location, and the historical drop-off location as training data and with the historical drop-off time minus the historical pick-up time as label to build a cruise time estimator, the cruise time estimator estimating a time to reach a destination based on the time, the location, and the destination of the one available order nearby, or based on the time, the location, and the anther location, and applying the cruise time estimator in each state transition to determine the next time corresponding to completion of the one available order nearby or to determine the next time corresponding to reaching the another location.

According to another aspect, a system for ride order dispatching may comprise a processor and a non-transitory computer-readable storage medium storing instructions that, when executed by the processor, cause the system to perform a method for ride order dispatching, which may be any method described herein.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4A illustrates a flowchart of an exemplary method for program security protection, in accordance with various embodiments.

DETAILED DESCRIPTION

Figure 1:
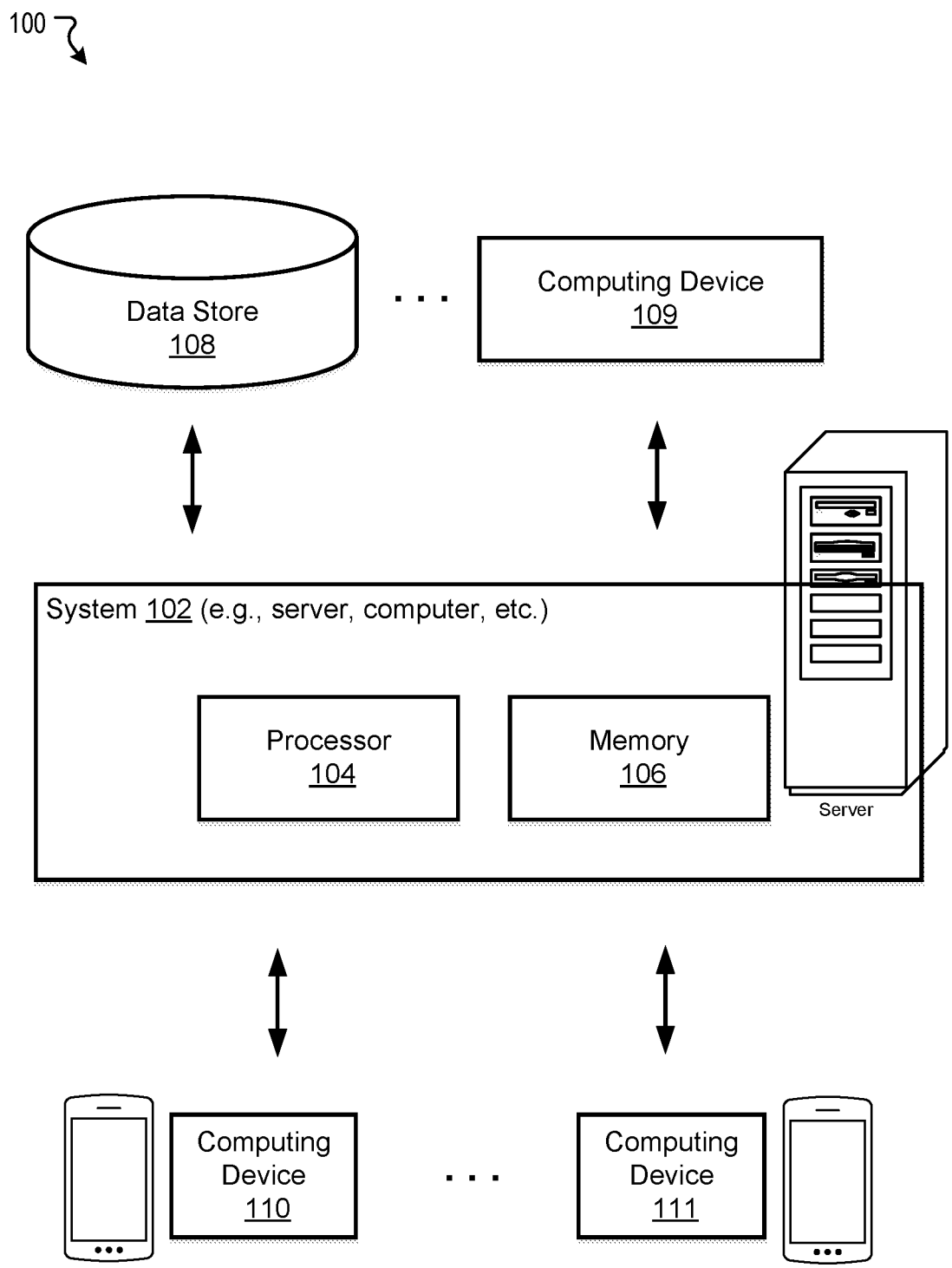
FIG. 1 illustrates an exemplary environment for ride order dispatching, in accordance with various embodiments.

Vehicle platforms may be provided for transportation services. Such vehicle platform may also be referred to as a vehicle hailing or vehicle dispatching platform, accessible through devices such as mobile phones installed with a platform application. Via the application, users (ride requestors) can transmit transportation requests (e.g., a pick-up location, a destination, a current location of the user) to the vehicle platform. The vehicle platform may relay the requests to vehicle drivers based on various factors (e.g., proximity to the location of the requestor or the pick-up location). The vehicle drivers can choose from the requests, and each can pick one to accept, fulfill the request, and be rewarded accordingly. After each trip, the vehicle driver may search for more requests or receive more requests from a push-based dispatching platform, and the results may vary depending on the demand for the vehicle service. For example, the results may return many requests if the vehicle is at a bar area on a weekend night, or may return no request if the vehicle is at a far-flung trip on a weekday evening.

To maximize the gain for the vehicle drivers (e.g., during a day), it is important for the vehicle platform to help them make the smartest decisions, for example suggesting the driver to re-position or accept a trip when displaying the results. Such problem can be naturally formulated as a Markov Decision Process (MDP). The MDP models can be roughly classified into single-driver or multi-driver. In single-driver models, there is a target driver, and the objective is to maximize his/her long-term revenue; in multi-driver models, there can be more than one driver, and the objective is to maximize the sum of their revenues. This disclosure focuses on the former. Existing single-driver models ignore the existence of competitors (other drivers) and always assume that a driver can get the best order. This assumption is far from the reality and usually cannot be deployed directly.

To at least mitigate the deficiencies of current models, two novel MDP models are disclosed. The disclosed models may consider competition and learn a smart strategy that can instruct the target driver how to cruise so as to maximize his/her long-term revenue. This strategy can be referred to as an instruction system. The first model (model 1) reflects the reality in a very detailed and accurate way, and the strategy trained from it is also closer to the real-life and can be deployed directly. However, the model's size may be large, which makes applying tabular implementation impossible. Therefore, model 1 may be solved by an algorithm involving neural network to find a strategy. The second model (model 2) is a simplified version of the first model and has a much smaller size. As a trade-off, the second model is less accurate than the first model but makes tabular implementation possible. The second model may be solved with a novel stochastic formulation. The advantage of such formulation is allowing applications optimization algorithms to the model. With acceleration and variance reduction, a solution to the second model can be found with better quality in a shorter time.

The disclosed systems and methods utilize the two disclosed models to obtain an optimal strategy that surpasses human decisions (decisions made by drivers of whether to reposition or take an order) and other models in terms of reward maximization. Therefore, the disclosed systems and methods improve the computer functionality by (1) providing such strategy to drivers in real time, allowing the drivers to maximize their earnings without reliance on personal experiences, and (2) allowing the vehicle platform to automatically dispatch vehicles, enhancing the functionality and user experience of the software platform. The disclosed system may deploy the first model in all types of areas, and may deploy the second model in rural areas where the model size is reduced with less data of the states.

FIG. 1 illustrates an exemplary environment 100 for dispatching ride order, in accordance with various embodiments. As shown in FIG. 1, the exemplary environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The system 102 may be implemented on or as devices such as mobile phone, tablet, server, computer, wearable device, etc. The system 102 above may be installed with a software (e.g., platform program) and/or hardware (e.g., wires, wireless connections) to access other devices of the environment 100.

The environment 100 may include one or more data stores (e.g., a data store 108) and one or more computing devices (e.g., a computing device 109) that are accessible to the system 102. In some embodiments, the system 102 may be configured to obtain data (e.g., first training data and second training data such as location, time, and fees for historical vehicle transportation trips) from the data store 108 (e.g., a database or dataset of historical transportation trips) and/or the computing device 109 (e.g., a computer, a server, a mobile phone used by a driver or passenger that captures transportation trip information such as time, location, and fees). The system 102 may use the obtained data to train the algorithm for ride order dispatching. The location may comprise GPS (Global Positioning System) coordinates of a vehicle.

The environment 100 may further include one or more computing devices (e.g., computing devices 110 and 111) coupled to the system 102. The computing devices 110 and 111 may comprise cellphone, tablet, computer, wearable device, etc. The computing devices 110 and 111 may transmit or receive data to or from the system 102.

In some embodiments, the system 102 may implement an online information or service platform. The service may be associated with vehicles (e.g., cars, bikes, boats, airplanes, etc.), and the platform may be referred to as a vehicle (service hailing or ride order dispatching) platform. The platform may accept requests for transportation, identify vehicles to fulfill the requests, arrange for pick-ups, and process transactions. For example, a user may use the computing device 110 (e.g., a mobile phone installed with a software application associated with the platform) to request transportation from the platform. The system 102 may receive the request and relay it to various vehicle drivers (e.g., by posting the request to mobile phones carried by the drivers). A vehicle driver may use the computing device 111 (e.g., another mobile phone installed with the application associated with the platform) to accept the posted transportation request and obtain pick-up location information. Fees (e.g., transportation fees) can be transacted among the system 102 and the computing devices 110 and 111. Some platform data may be stored in the memory 106 or retrievable from the data store 108 and/or the computing devices 109, 110, and 111. For example, for each trip, the location of the origin and destination (e.g., transmitted by the computing device 111), the fee, and the time can be obtained by the system 102.

In some embodiments, the system 102 and the one or more of the computing devices (e.g., the computing device 109) may be integrated in a single device or system. Alternatively, the system 102 and the one or more computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the system 102 and the computing device 109 are shown as single components in this figure, it is appreciated that the system 102 and the computing device 109 can be implemented as single devices or multiple devices coupled together. The system 102 may be implemented as a single system or multiple systems coupled to each other. The system 102, computing device 109, data store 108, and computing device 110 and 111 may be able to communicate with one another through one or more wired or wireless networks (e.g., the Internet) through which data can be communicated. Various aspects of the environment 100 are described below in reference to FIG. 2 to FIG. 5.

Figure 2:
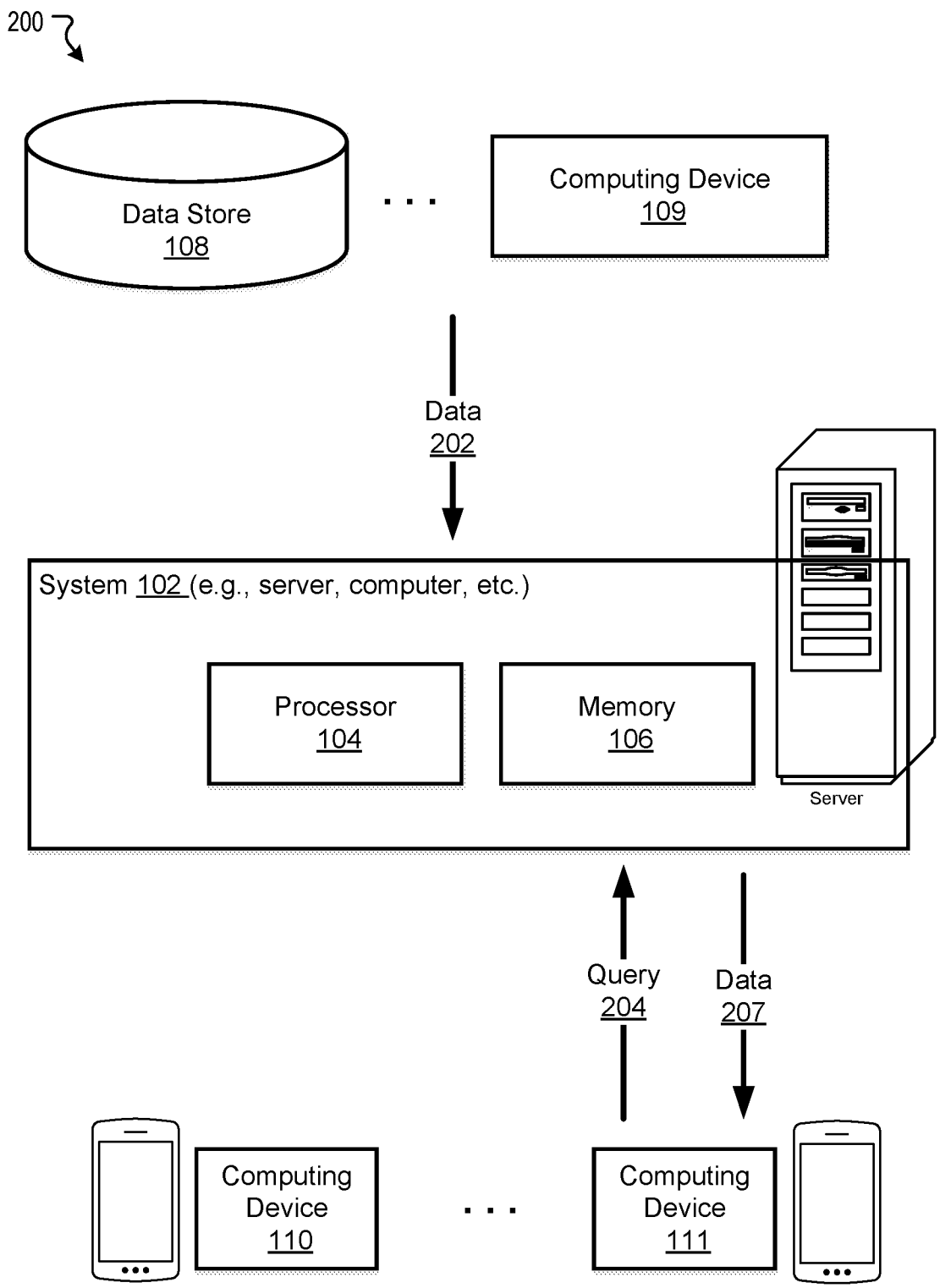
FIG. 2 illustrates an exemplary system for program security protection, in accordance with various embodiments.

FIG. 2 illustrates an exemplary system 200 for dispatching ride order, in accordance with various embodiments. The operations shown in FIG. 2 and presented below are intended to be illustrative. In various embodiments, the system 102 may obtain data 202 (e.g., historical or simulated vehicle trips) from the data store 108 and/or the computing device 109. The obtained data 202 may be stored in the memory 106. The system 102 may train an algorithm with the obtained data 202 to learn a model (e.g., model 1) for dispatching ride order, or solve a model (e.g., model 2) for dispatching ride order. For deployment, the system 102 may obtain a current location of a current vehicle. For example, the computing device 111 may transmit a query 204 to the system 102, the query comprising a Global Positioning System (GPS) location of the current vehicle. The computing device 111 may be associated with a driver of a service vehicle including, for example, taxi, service-hailing vehicle, etc. Accordingly, the system 102 may perform various steps with the comprised information, apply the model, and send data 207 to the computing device 111 or one or more other devices. For example, the system 102 may obtain a current list of available orders nearby based on the current location, and apply any disclosed model with inputs such as the current location, the current tune, and the available orders nearby. The data 207 may comprise an instruction or recommendation for an action, such as re-positioning to another location, accepting a new ride order, etc. The driver may accept the instruction to accept an order or reposition, or refuse and remain at the same position.

In some embodiments, the rider order dispatching problem can be approached by Reinforcement learning (RL). RL is a type of machine learning, which emphasizes on learning through interacting with the environment. In RL, an RL agent repeatedly observes the current state of the environment, takes an action according to certain policy, gets an immediate reward and transits to a next state. Through trial-and-error, the agent aims to learn a best policy under which the expected cumulative reward can be maximized.

In some embodiments, the RL for ride order dispatching may be modeled as a Markov decision process (MDP). In this disclosure, an infinite-horizon discounted Markov Decision Problem (DMDP) may be used. An instance of the DMDP contains a finite space of states S, a finite space of actions $\mathcal{A}$, a collection of state-to-state transition probabilities $\mathcal{P} := \{p_{ij}(a) | i, j \in S, a \in \mathcal{A}\}$ which is unknown; a collection of state transitional rewards $R := \{r_{ij}(a) | i, j \in S, a \in \mathcal{A}\}$, where $0 < r_{ij}(a) < 1$, $\forall i, j \in S, a \in \mathcal{A}$; the discounted factor $\gamma \in (0, 1)$. A stationary and randomized policy is then defined as a map $\pi: S \mapsto P(\mathcal{A})$, where $P(\mathcal{A})$ is a probability distribution vector over $\mathcal{A}$. If $\pi$ is deterministic, then $\pi(s)$ has only one nonzero entry equal to 1. Given $\pi$, let $\pi_i(a) := \pi(i)[a]$, $P^\pi$ denotes the transition probability matrix of the Discounted MDP (DMDP) under the policy $\pi$, where $P_{ij}^\pi = \Sigma_{a \in \mathcal{A}} p_{ij}(a) \pi_i(a)$, $\forall i, j \in S$. The objective of DMDP is to maximize the expected cumulative reward regardless of the initial state $s_0$:

$$\underset{\pi}{\text{maximize}} \, \mathbb{E}^\pi \left[ \sum_{i=0}^\infty \gamma^t r_{s_t s_{t+1}}(a_t) | s_0 \right]$$

Here, $a_t$ is determined by $\pi$, and then $s_{t+1}$ follows the probability distribution $P(s_{t+1}=j) = p_{s_t j}(a_t)$.

In some embodiments with respect to the first model (model 1), the agent is the system. The system observes the state of the target driver, then provides an instruction for him/her to cruise. The instruction can be an order request, then the driver will finish the order and end up at the drop-off location. Alternatively, the instruction can be a re-positioning suggestion (without an order), then the driver can accept or decline such instruction. The MDP model may be defined as follows.

Figure 3A:
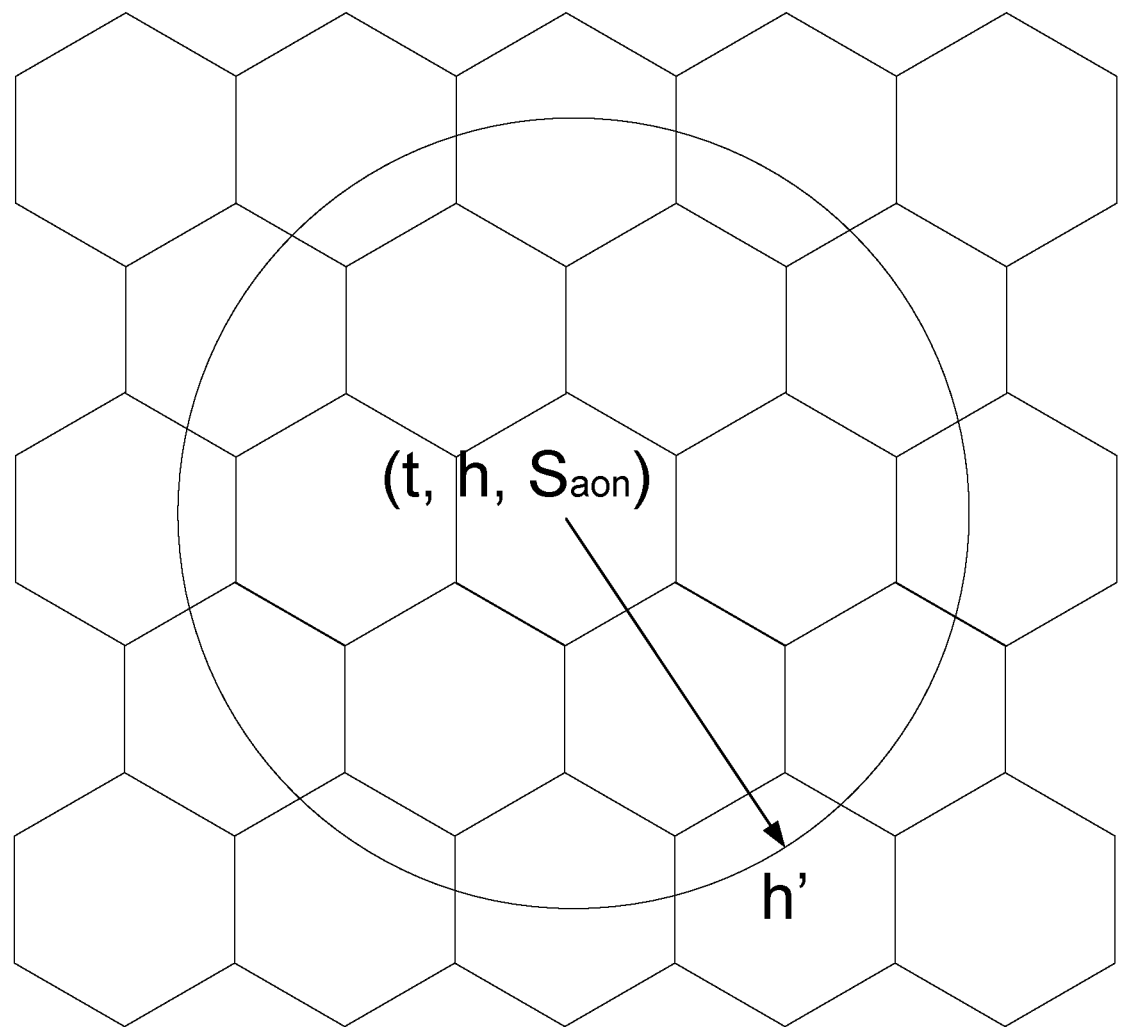
FIG. 3A illustrates an exemplary action search for ride order dispatching for model 1, in accordance with various embodiments.

First, states and actions of the first model are described. The activity area of the target driver may be discretized into a plurality of repeating zones (e.g., a group of hex-cells as shown in FIG. 3A) and twenty-four hours into a list of time slot, e.g., ten minutes per slot. In this model, it may be assumed that, all orders need to be taken as soon as possible, and the hypothetical driver only takes orders having pick-up locations in the same hex-cell as the driver. The former assumption ignores the situation when the order is requested to depart in an hour or so, and the latter assumption is a natural outcome of the former. However, with the existence of competitors, a driver can not always take any order he wants. This problem has not been addresses in existing technologies and models. To address this problem, all new orders in the cell that the driver is located may be partitioned averagely and randomly, and the driver only gets to choose the optimal one front his/her partition. "Averagely" means that no driver gets more order to choose from than other drivers, and "randomly" means that an order can be partitioned into any driver's share. The driver's partition may be referred to as the available orders nearby. In one example, suppose the target driver is at the cell h, at the time slot t, with a set of new orders $S_{no}$, where $|S_{no}|=n$, and in competitors in the same cell, then the target driver's available orders nearby is defined as:

$$S_{aon} := \left\{ \lceil \frac{n}{m} \rceil \text{ randomly picked orders in } S_{no}. \right\}$$

In this model, each state may contain the following information:
1. t: current time (e.g., time slot index)
2. h: the driver's current location (e.g., hex-cell index)
3. $S_{aon}$: the available orders nearby (e.g., a list of hex-cell indices representing the destinations of the orders).

Each action is to transit to a next hex-cell of a different location h' (as shown in FIG. 3A). The arrow shown in FIG. 3A represents a transition from one state to another by an action. The arrow's origin is the target driver with state (t, h, $S_{aon}$). The action is to transit to the hex-cell h', for example, by taking an order or by repositioning.

Next, the state transition is described. With the current state being s:=(t, h, $S_{aon}$) and the current action being a:=h', several scenarios may happen:
- h'$\in S_{aon}$, e.g., the instruction is to finish an order, then the driver will follow the instruction.
- h'$\notin S_{aon}$, e.g., the instruction is a re-positioning suggestion, and the driver accepts it.
- h'$\notin S_{aon}$, e.g., the instruction is a re-positioning suggestion, and the driver rejects it.

The next state and the reward depend on the scenarios. The next state s' and the reward r are then:

$$s' = \begin{cases} (t + T(t, h, h'), h', S'_{aon}), & h' \in S_{aon} \text{ or } \xi <= P_{repo}, \\ (t, h, S_{aon}), & h' \notin S_{aon} \text{ and } \xi > P_{repo}, \end{cases}$$

$$r = \begin{cases} f(t, h, h') & h' \in S_{aon} \\ 0, & h' \notin S_{aon}. \end{cases}$$

where $\xi$ is an r.v. uniformly distributed in [0, 1] and $S'_{aon}$ is the set of available orders nearby for the time t+T(t,h,h') and the hex cell h'. Various other notations are described in Table 1 below.

TABLE 1

Notations for Model I

| Variable | Meaning |
|---|---|
| $P_{repo}$ | The probability of the driver accepting a re-positioning instruction. |
| f (t, h, h') | The fare for completing order as cruising from h at t to h'. |
| T (t, h, h') | The time of cruise from h to h' starting at t. |

In some embodiments, the MDP of model 1 can be trained online with real-time data (e.g., historical trip data) or through a simulator (e.g., simulated trip data) with the inputs being a state and an action and the outputs being a next state and a reward. For example, a neural network such as DQN (deep neural network) can be applied, and the model 1 can be solved by data training and machine learning.

In some embodiments with respect to the second model (model 2), a simplified model can be obtained and applied with the amount of state data is not large. First, the states and actions of the second model are described. In model 2, the basic settings are the same as model 1, except that each state contains the following information:
1. t: current time (e.g., time slot index)
2. the driver's current location (e.g., hex-cell index)
3. n: $|S_{aon}|$ (e.g., an integer).

Figure 3B:
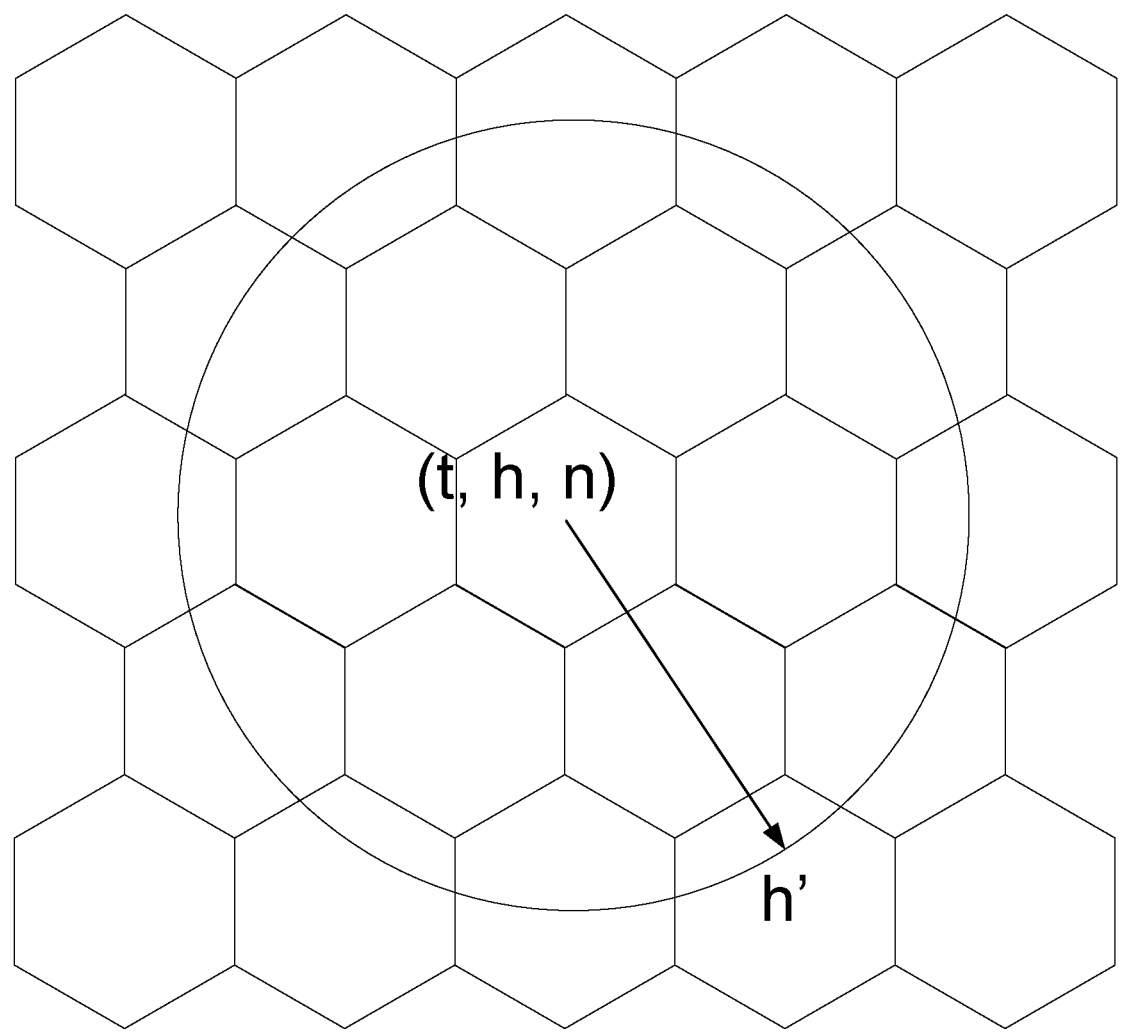
FIG. 3B illustrates an exemplary action search for ride order dispatching for model 2, in accordance with various embodiments.

Each action is still to transit to a next cell h' (as shown in FIG. 3B). The arrow shown in FIG. 3B represents a transition from one state to another by an action. The arrow's origin is the target driver with state (t,h,n). The action is to transit to the hex-cell h', for example, by taking an order or by repositioning.

With the current state being s:=(t,h,n) and the current action being a:=h', several scenarios may happen:
The action is to finish an order;
The action is a re-positioning suggestion, and the driver accepts it;
The action is a re-positioning suggestion, and the driver rejects it.

The next state and the reward depend on the scenarios. Some related probabilities as listed in Table 2.

TABLE 2

Notations of Parameters

| Variable | Meaning |
|---|---|
| $T_{drive}$(t, h, h') | The time of cruise from h to h' starting at t. |
| f (t, h, h') | The fare of a cruise from h at t to h'. |
| $P_{yesvt}$ | The probability of the driver accepting a vacant transition instruction. |
| $P_{des}$(h'\|t, h) | The probability of an order going to h' given it departs at (t, h). |
| $P_{od}$(h'\|t, h, n) | The probability of ∃ an order goes to h' given there are n orders depart at (t, h). |
| n(t, h) | The number of available orders nearby given time and location. |

Note that as shown in Table 2:

$$p_{des}(h'|t,h) = p_{od}(h'|t,h,1)$$

$$p_{od}(h'|t,h,n) = 1-(1-(p_{des}(h'|t,h))^n$$

Then the next state s' and the reward r will be $$s' = \begin{cases} (t + T_{drive}(t, h, h'), h', n'), & \text{with probability } q, \\ (t, h, n), & \text{with probability } 1 - q, \end{cases}$$

$$r = \begin{cases} (f(t, h, h'), & \text{with probability } P_{od}(h' | t, h, n), \\ 0, & \text{with probability } 1 - P_{od}(h' | t, h, n), \end{cases}$$

where $q := P_{od}(h'|t, h, n) + (1 - P_{od}(h'|t, h, n)) \times P_{yesvt}$.

Model 2 can also be solved using a neuron network. Alternatively, model 2 can be solved by applying acceleration and variance reduction algorithms on tabular implementation, the details of which are described below.

In some embodiments, to solve model 2 without a neuron network, stochastic formulation can be first implemented. Given a DMDP instance $(S, \mathcal{A}, P, r, \gamma)$ and a policy $\pi$, the value vector $v^\pi \in \mathbb{R}^{|S|}$ is defined as:

$$v_i^\pi = \mathbb{E}^\pi \left[ \sum_{t=0}^{\infty} \gamma^t r_{s_t s_{t+1}}(a_t) | s_0 = i \right], \forall i \in S.$$

The optimal value vector v* is defined as:

$$v_i^* = \max_\pi v_i^\pi.$$

And a maximizer is known as the optimal policy $\pi^*$. It is well-known that a vector v* is the optimal value vector if and only if it satisfies the Bellman equation:

$$v_i^* = \max_{a \in \mathcal{A}} \left\{ \sum_{j \in S} p_{ij}(a) r_{ij}(a) + \gamma \sum_{j \in S} p_{ij}(a) v_j^* \right\}, \forall i \in S, \quad (1)$$

where j represents the next state.
Lemma 1 The optimal value vector v* is the minimizer of the following linear programming:

$$\text{minimize}_v \; q^T v \quad (2)$$

$$\text{subject to } (\tilde{I} - \gamma \tilde{P}) v \geq r,$$

where q is an arbitrary positive distribution, $\tilde{I} \in \mathbb{R}^{|\mathcal{A}||S| \times |S|} := [I_{|S| \times |S|}; I_{|S| \times |S|}; \ldots; I_{|S| \times |S|}]$, $\tilde{P} \in \mathbb{R}^{|\mathcal{A}||S| \times |S|} := [P_{a_1}; P_{a_2}; \ldots; P_{a_n}]$, $r \in \mathbb{R}^{|S||\mathcal{A}|} := [r_{a_1}; r_{a_2}; \ldots; r_{a_n}]$, $r_{a,i} = \sum_{j \in S} p_{ij}(a) r_{ij}(a)$.

Proof 1 (1) implies that v* is in the feasible set. Any feasible point v satisfies v≥v*. Since q is positive, v* is the minimizer.

The dual problem of (2) is $$\text{maximize}_\mu \; r^T \mu$$

$$\text{subject to } (\tilde{I} - \gamma \tilde{P})^T \mu = q$$

$$\mu \geq 0,$$

where $\mu = [\mu_{a_1}; \mu_{a_2}; \ldots; \mu_{a_n}]$. Every feasible point can recover a stationary randomized policy and any stationary randomized policy can form a feasible point. Indeed, there exists a bijection between the feasible set and the stationary randomized policy space.

If the reward is uniformly bounded, there exists an optimal solution $\mu^*$ to the dual LP, which can formulate an optimal policy $\pi^*$ in the sense that the value vector under $\pi^*$ equals $v^*$. If $\mu^*$ is unique, then $\pi^*$ is deterministic; otherwise $\pi^*$ is randomized policy. Therefore, instead of value iteration or policy iteration, the MDP can be solved in a linear programming approach. In the reinforcement learning context, P and r are unknown and can be very large. Solving primal LP or dual LP separately is not ideal since it involves solving a large linear constraint which can not be relaxed without changing the original problem. Therefore, a feasible point problem may be formulated as:

$$\text{minimize } 0$$
$$\text{subject to } \begin{bmatrix} 0 & 0 & (\gamma\tilde{P}-\tilde{I})^T & q \\ \gamma\tilde{P}-\tilde{I} & I & 0 & r \\ q^T & 0 & -r^T & 0 \end{bmatrix} \begin{bmatrix} v \\ w \\ \mu \\ \tau \end{bmatrix} = 0$$
$$w \geq 0, \mu \geq 0, \tau = 1.$$

This formulation follows the KKT conditions of the LP. It is denoted that $x:=[v,w,\mu,\tau]$, and a new constraint $x \in \mathcal{C} := \mathcal{V} \times \mathcal{W} \times \mathcal{U} \times 1$ is imposed, where:

$v \in \mathcal{V} := \{v | 0 \leq v, \|v\|_\infty \leq 1/(1-\gamma)\},$ $w \in \mathcal{W} := \{w | 0 \leq w \leq 1\},$ $\mu \in \mathcal{U} := \{\mu | 0 \leq \mu, e^T \mu = 1\},$ An optimal solution $v^*$, $\mu^*$ are in the constraint set since q is a probability distribution and $r_{a,i}$ is in [0, 1]. The above problem can be relaxed as a convex optimization over a bounded convex constraint without loss of accuracy:

$$\underset{x}{\text{minimize}} \; \frac{1}{2}\|Mx\|^2 \quad (3)$$
$$\text{subject to } x \in C,$$

where $x:=[v,w,\mu,\tau]$, $\mathcal{C} := \mathcal{V} \times \mathcal{W} \times \mathcal{U} \times 1$, and M is a full rank matrix in $\mathbb{R}^{M \times N}$ ($M=|\mathcal{S}||\mathcal{A}|+|\mathcal{S}|+1$, $N=2|\mathcal{S}||\mathcal{A}|+|\mathcal{S}|+1$). Since x can never be 0 the solution is always nontrivial. Notice that although M is unknown (due to $\tilde{P}$), it can be represented as the expectation of a random variable $\xi$ (check Lemma 2 for details). Then (3) can be further expressed as a stochastic composition optimization problem:

$$\underset{x \in C}{\text{minimize}} \; f(x) := \frac{1}{2}\|\mathbb{E}(\xi)x\|^2. \quad (4)$$

Lemma 2 (4) is equivalent to (3) by letting $\xi_{(i,a,j)}$ follow the distribution as below:

$$\xi_{(i,a,j)} = \begin{bmatrix} 0 & 0 & A_{(i,a,j)}^T & \frac{q_i}{\nu(i)}e_i \\ A_{(i,a,j)} & E_{a,i} & 0 & \frac{r_{ij}(a)}{\eta(i,a)}e_{a,i} \\ \frac{q_i}{\nu(i)}e_i^T & 0 & -\frac{r_{ij}(a)}{\eta(i,a)}e_{a,i}^T & 0 \end{bmatrix} \sim \eta(i,\alpha)p_{ij}(a).$$

Here $A_{(i,a,j)}$ is a tall matrix with the same structure as $\tilde{P}$: $\mathcal{A}$ blocks (each block has size $|S| \times |S|$) arranged in a vertical way corresponding to each action. There are only two nonzero entries in $A_{(i,a,j)}$: the (i,i)th entry in the block for action a equaling $$-\frac{1}{\eta(i,a)},$$

the (i,j)th entry in the block for action a equaling $$\frac{\gamma}{\eta(i,a)};$$

$E_{a,i} \in \mathbb{R}^{|S||A| \times |S||A|}$ has only one nonzero entries: the (i,i)th entry in the diagonal block for action a, equaling $$\frac{1}{\eta(i,a)};$$

$e_i$ is a vector in $\mathbb{R}^{|S|}$ with only one nonzero entry at the ith component whose value is 1, and $e_{a,i}$ is a vector in $\mathbb{R}^{|A||S|}$ with only one nonzero entry at the ith component for block a whose value is 1; $\nu(i) = \Sigma_a \eta(i,a)$.

$\eta(i,a)p_{ij}(a)$ is the probability of tuple (i,a,j) being selected with $\Sigma_{i,a,j}\eta(i,a)p_{ij}(a)=1$. $\eta(i,a)$ is a distribution that can be imposed artificially, so engaging the value of $\eta(i,a)$ in $\xi$ is not a problem. The only unknown and to-be-learned factor is $p_{ij}(a)$.

In some embodiments, four types of alternative sampling-based algorithms can be used to solve problem (4). In optimization area, usually an algorithm is developed for a class of problems, to be more abstract, a very general math format. In order to use an algorithm, one should first write the to-be-solved problem into a correct format. Here, to apply acceleration and variance reduction algorithms, the original form (4) needs to be revised slightly.

In some embodiments, there is access to a Sampling Orable ($S\mathcal{O}$) (described later) which produces samples of $\xi$ in Lemma 2. Also, two operators are defined as follows:

Definition 1 Given a point $x:=[v; w; \mu; \tau] \in \mathcal{C}$ and a vector $g:=[g_v; g_w; g_\mu; g_r] \in \mathbb{R}^N$, operator $\text{PGKL}_{\mathcal{C},\eta} : \mathcal{C} \times \mathbb{R}^N \mapsto \mathcal{C}$ is defined as $\text{PGKL}_{\mathcal{C},\eta}(x, \Delta):=[v'; w'; \mu'; 1]$, where $$v' = \underset{v' \in \mathcal{V}}{\arg\min} \, g_v^T(v'-v) + \frac{1}{2\eta}\|v'-v\|_2^2$$

$$w' = \underset{w' \in \mathcal{W}}{\arg\min} \, g_w^T(w'-w) + \frac{1}{2\eta}\|w'-w\|_2^2$$

$$\mu' = \underset{\mu' \in \mathcal{U}}{\arg\min} \, g_\mu^T(\mu'-\mu) + \frac{1}{2\eta}\mathcal{D}_{KL}(\mu';\mu),$$

Definition 2 Given a point $x:=[v; w; \mu; \tau] \in \mathcal{C}$ and a vector $g:=[g_v; g_w; g_\mu; g_r] \in \mathbb{R}^N$, operator $\text{PGSP}_{\mathcal{C}\eta} : \mathcal{C} \times \mathbb{R}^N \mapsto \mathcal{C}$ is defined as $\text{PGSP}_{\mathcal{C}\eta}(x, \Delta):=[v'; w'; \mu'; 1]$, where $$v' = \underset{v' \in \mathcal{V}}{\arg\min} \, g_v^T(v'-v) + \frac{1}{2\eta}\|v'-v\|_2^2$$

-continued $$w' = \underset{w' \in \mathcal{W}}{\arg\min} \, g_w^T(w' - w) + \frac{1}{2\eta}\|w' - w\|_2^2$$

$$\mu' = \underset{\mu' \in \mathcal{U}}{\arg\min} \, g_\mu^T(\mu' - \mu) + \frac{1}{2\eta}\|\mu' - \mu\|_2^2,$$

In some embodiments, the first algorithm used for solving problem (4) is Accelerated Stochastic Composition Gradient Descent (ASCGD). ASCGD target problems with the form:

$$\underset{x \in C}{\text{minimize}} \, \mathbb{E}f(\mathbb{E}g(x))$$

Problem (4) is this kind of pattern. But compared with the general form, (4) has two characteristics: the inner functional $\mathbb{E}|\xi|x$ is linear, the outer function $\|\cdot\|_2^2$ is deterministic (with no $\mathbb{E}$).

The first algorithm ASC-RL (Accelerate Stochastic Composition algorithm for Reinforcement Learning) in Algorithm 1 is based on ASCGD.

---

Algorithm 1 SCRL

1: Initialize $x^0 = z^0 = y^0 = 0$, sample $\xi_0$ from $S\mathcal{O}$;
2: for k    0 to K − 1 do
3:     $x^{k+1} = PGKL_{C,\eta_k}(x^k, \xi_k^T y^k)$;
4:     $z^{k+1} = \left(1 - \frac{1}{\beta_k}\right)x^k + \frac{1}{\beta_k}x^{k+1}$;
5:     sample $\xi_{k+1}$ from $S\mathcal{O}$;
6:     $y^{k+1} = (1 - \beta_k)y^k + \beta_k \xi_{k+1} z^{k+1}$.
7: end for
8: return $\hat{x} := \frac{2}{K}\sum_{k=K/2}^{K} x^k$.

---

In some embodiments, the second algorithm used for solving problem (4) is Stochastic Accelerated GradiEnt (SAGE). This algorithm is targeted to problems like:

$$\underset{x \in C}{\text{minimize}} \, \mathbb{E}f(x).$$

The original problem (4) does not belong to this group because the expectation is not outside. However, problem (4) can be transformed into this form by introducing two i.i.d random variables $\xi^1, \xi^2$ which follow the same distribution in Lemma 2. Then the new problem is:

$$\underset{x \in C}{\text{minimize}} \, f(x) := \mathbb{E}\left[\frac{1}{2}x^T \xi_1^T \xi_2 x\right]. \quad (5)$$

The developed second algorithm. ASGD-RL is summarized in Algorithm 2 to solve (5) based on an accelerated projected stochastic gradient descent algorithm called SAGE.

---

Algorithm 2 ASGD-RL

1: Initialize $x^0 = z^0 = y^0 \in \mathcal{C}$;
2: for k    0 to K − 1 do
3:     Sample $\xi_k^1, \xi_k^2$ from $S\mathcal{O}$.
4:     $x^{k+1} = (1 - \alpha_k)y^k + \alpha_k z^k$;

---

Algorithm 2 ASGD-RL

5:     $y^{k+1} = PGSP_{C,\beta_k}\left(x^{k+1}, \frac{(\xi_k^1)^T \xi_k^2 + (\xi_k^2)^T \xi_k^1}{2} x^{k+1}\right)$;
6:     $z^{k+1} = z^k - x^{k+1} + y^{k+1}$.
7: end for
8: return

---

In some embodiments, the third algorithm used for solving problem (4) is Katyusha-Xw developed. Katyusha solves problems whose objective function is the sum of a group of functions with the sum being convex:

$$\underset{x \in C}{\text{minimize}} \frac{1}{n}\sum_{i=1}^{n} f_i(x).$$

In order to use this algorithm, the real expectation is approximated by a group of samples' average, thus problem (4) is then rewritten as:

$$\underset{x \in C}{\text{minimize}} f(x) := \frac{1}{2}x^T \left(\frac{1}{n}\sum_{i=1}^{n}\xi_i\right)^T \left(\frac{1}{n}\sum_{i=1}^{n}\xi_i\right) x^T$$

$$= \frac{1}{n^2}\sum_{i=1,j=1}^{n}\frac{1}{2}x^T \xi_i^T \xi_j x$$

The third algorithm is shown in Algorithm 3.

---

Algorithm 3 SAA-RL-I

1: Initialize $x^0 = z^0 = y^{-1}$, n samples $\{\xi_1, \xi_2, \ldots, \xi_n\}$, batch-size b
2: for k    0 to K − 1 do
3:     $x^{k+1} = \frac{(3k+1)y^k + (k+1)x^k - (2k-2)y^{k-1}}{2k+4}$;
4:     $g = \nabla f(x^{k+1})$;
5:     $w^0 = x^{k+1}$;
6:     for $t \leftarrow 0$ to $T := \frac{n^2}{b}$ do
7:         Let $S_t$ be b i.i.d uniform random indices-pairs (i, j) from ([n], [n]);
8:         $\tilde{\nabla}_t = g + \frac{1}{b}\sum_{(i,j) \in S_t}\left(\frac{\xi_i^T \xi_j + \xi_j^T \xi_i}{2}(w^t - x^{k+1})\right)$;
9:         $w_{t+1} = PGSP_{C,\eta}(w_t, \tilde{\nabla}_t)$;
10:    end for
11:    $y^k \quad y^{k+1}$
12:    $y^{k+1} \quad w^T$;
13: end for
14: return $y^K$

---

In some embodiments, the fourth algorithm used for solving problem (4) is Prox-SVRG. This algorithm considers problems as:

$$\underset{x \in C}{\text{minimize}} \frac{1}{n} \sum_{i=1}^{n} f_i(x)$$

very similar to 3 but each $f_i$ is not required to be convex. To apply this algorithm, problem (4) can be rewritten as:

$$\underset{x \in C}{\text{minimize}} f(x) := \frac{1}{n} \sum_{i=1}^{n} \frac{1}{2} x^T (\xi_i^1)^T \xi_i^2 x.$$

The fourth algorithm SAA-RL-II is presented in Algorithm 4.

---

Algorithm 4 SAA-RL-III

1: Initialize $x^0 = w$, n pairs of samples $\{(\xi_1^1, \xi_1^2), (\xi_2^1, \xi_2^2) \ldots, (\xi_n^1, \xi_n^2)\}$, batch-size b
2: for k    0 to K − 1 do
3:    g    $\nabla f(x^k)$;
4:    for t    0 to T do
5:       Uniformly randomly pick $I_t \subset \{1, \ldots, n\}$ (with replacement) such that $|I_t| = b$
6: 
$$\tilde{\nabla}_t \leftarrow g + \frac{1}{b} \sum_{i \in I_t} \left( \frac{(\xi_k^1)^T \xi_k^2 + (\xi_k^2)^T \xi_k^1}{2} (w^t - x^k) \right);$$

7:       $w^{t+1}$ = $PGKL_{C,\eta}(w^t, \tilde{\nabla}_t)$;
8:    end for
9:    $x^{k+1}$    $w^T$;
10: end for
11: return $y^K$

---

As such, there are multiple types of algorithms for solving the DMDP, after transformation to appropriate formulation. Different algorithms have different advantages and disadvantages, which are often determined by a problem's specialty and the data. Given a DMDP, a flexible formulation makes it possible to choose the best algorithm for this specific case.

In some embodiments, a Sample Oracle (e.g., database) from a dataset. First of all, the SO is supposed to take a state-action pair (s,a) as input, then produces a state-reward pair (s', r) as output, where s' represents a next state starting from s with action a and r:=$r_{ss'}$(a). By the state transition rule above for model 2, all the information listed in Table 2 is needed.

In some embodiment, in the dataset, each instance contains: order ID, driver ID, pick-up time, pick-up latitude, pick-up longitude, drop-off time, drop-off latitude, drop-off longitude. All time and locations may be simplified to discretized time indices and hex-cell indices. Then, the following information can be obtained by respective methods:

$T_{drive}(t,h,h')$: use random forest classifier to build an estimator of cruise time. The data is pick-up time and the Euclidean distance (or l1-norm) between the latitudes-longitudes of centers of h and h'. The label is drop-off time minus pick-up time.

f(t,h,h'): proportional to $T_{drive}(t,h,h')$ with a minor noise.

$P_{yesvt}$: 0.4

$$P_{des}(h' \mid t, h): \frac{\#\{\text{historical orders starting at } (t, h) \text{ and going to } h'\}}{\#\{\text{historical orders starting at } (t, h)\}}.$$

$$n(t, h): \max\left(0, \min\left(5, \frac{\#\{\text{historical orders starting at } (t, h)\} + \text{noise}}{\#\{\text{available drivers at } (t, h)\}}\right)\right),$$

where

{available drivers at $(t, h)$} = #{drivers starting order at $(t, h)$} +

{drivers finishing orders at $(t, h)$} −

{drivers finishing and starting orders at $(t, h)$} + noise.

After getting these information, a next state and the reward following the rules described above for the state transition of model 2 can be obtained.

FIG. 4A illustrates a flowchart of an exemplary method 400, according to various embodiments of the present disclosure. The method 400 may be implemented in various environments including, for example, the environment 100 of FIG. 1. The exemplary method 400 may be implemented by one or more components of the system 102 (e.g., the processor 104, the memory 106). The exemplary method 400 may be implemented by multiple systems similar to the system 102. The operations of method 400 presented below are intended to be illustrative. Depending on the implementation, the exemplary method 400 may include additional, fewer, or alternative steps performed in various orders or in parallel. The model in this figure may be referred to model 1 and related descriptions above. Model 1 may be solved by a neural network (e.g., DQN) with machine learning techniques.

Block 402 comprises obtaining a current location of a current vehicle from a computing device associated with the current vehicle. Block 403 comprises obtaining a current list of available orders nearby based on the current location. Block 404 comprises feeding the current location, the current list of available orders nearby, and a current time to a trained Markov Decision Process (MDP) model to obtain action information, the action information being repositioning the current vehicle to another current location or comleting a current ride order by the current vehicle. Block 405 comprises transmitting the generated action information to the computing device to cause the current vehicle to reposition to the another current location, stay at the current location, or accept the current ride order by proceeding to a pick-up location of the current ride order. The MDP model is trained based on a plurality of historical or simulated vehicle trips under a policy of maximizing a cumulative reward for a training vehicle completing the historical or simulated vehicle trips. The MDP model discretizes a region into repeating zones and a time period into time slots. Each state of the MDP model comprises: a time represented by a time lot index, a location represented by a repeating zone index, and a list of available orders nearby represented by repeating zone indices of destinations of the available orders nearby. Each action of the MDP model comprises: completing one of the available orders nearby from the list, repositioning to another location, or staying at the location. If the training vehicle completes one of the available orders nearby from the list, the training vehicle gets a fare for completing the one available order nearby as the reward, and the state transitions to a next state comprising: a next time corresponding to completion of the one available order nearby, a next location corresponding a destination of the one available order nearby, and a next list of available orders nearby corresponding the next location. If the training vehicle repositions to the another location, the training vehicle gets no reward, and the state transitions to a next state comprising: a next time corresponding to reaching the another location, the another location, and a next list of available orders nearby corresponding the another location. If the training vehicle stays at the location, the training vehicle gets no reward, and the state transitions to a next state comprising: the time, the location, and the list of available orders nearby.

In some embodiments, for training the MDP model, the location and pick-up locations of the available orders nearby are in a same repeating zone. For application of the trained MDP model, the current location and a pick-up location of the current ride order are within a same repeating zone.

In some embodiments, for training the MDP model, all orders with pick-up locations in a repeating zone corresponding to the location are divided averagely and randomly among all vehicles in the repeating zone corresponding to the location to obtain the list of available orders nearby for the training vehicle. For application of the trained MDP model, all current orders with pick-up locations in a repeating zone corresponding to the current location are divided averagely and randomly among all current vehicles in the repeating zone corresponding to the current location to obtain the current list of available orders nearby for the current vehicle.

In some embodiments, for training the MDP model, the list of available orders nearby for the training vehicle is a ceiling function of a division of the all orders with pick-up locations in the repeating zone corresponding to the location by the all vehicles in the repeating zone corresponding to the location. For example, the list may comprise five available orders nearby. For application of the trained MDP model, the current list of available orders nearby for the current vehicle is a ceiling function of a division of the all current orders with pick-up locations in the repeating zone corresponding to the current location by the all current vehicles in the repeating zone corresponding to the current location to obtain. For example, the list may comprise five available orders nearby.

Figure 4B:
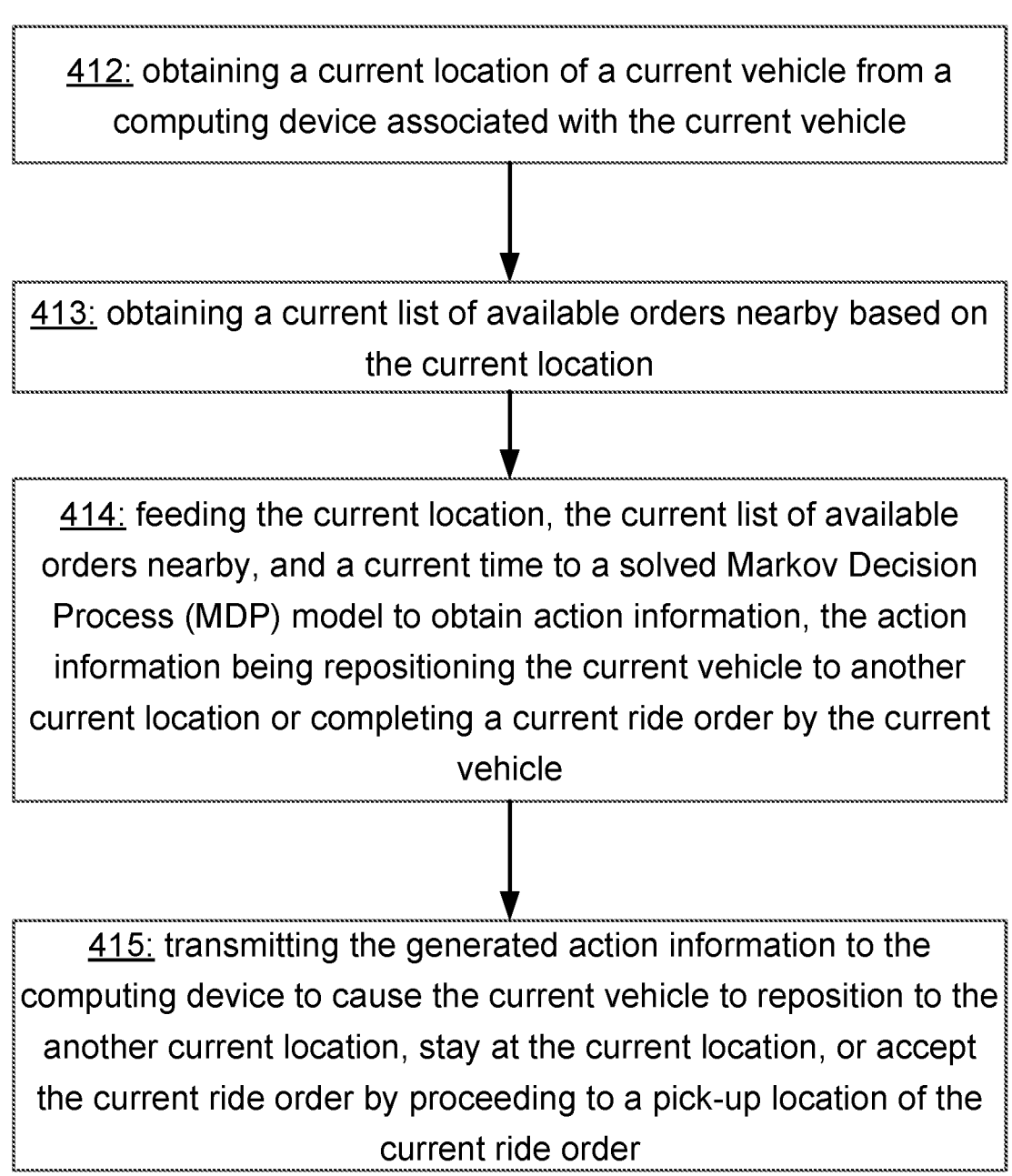
FIG. 4B illustrates a flowchart of another exemplary method for program security protection, in accordance with various embodiments.

FIG. 4B illustrates a flowchart of an exemplary method 410, according to various embodiments of the present disclosure. The method 410 may be implemented in various environments including, for example, the environment 100 of FIG. 1. The exemplary method 410 may be implemented by one or more components of the system 102 (e.g., the processor 104, the memory 106). The exemplary method 410 may be implemented by multiple systems similar to the system 102. The operations of method 410 presented below are intended to be illustrative. Depending on the implementation, the exemplary method 410 may include additional, fewer, or alternative steps performed in various orders or in parallel. The model in this figure may be referred to model 2 and related descriptions above. Model 2 may be solved by a neural network with machine learning technique or by applying acceleration and variance reduction algorithms described earlier. That is, solving the MDP model below may comprise solving the MDP model based on applying acceleration and variance reduction algorithms to tabular implementation.

Block 412 comprises obtaining a current location of a current vehicle from a computing device associated with the current vehicle. Block 413 comprises obtaining a current number of available orders nearby in a current list based on the current location. Block 414 comprises feeding the current location, the current number of available orders nearby, and a current time to a solved Markov Decision Process (MDP) model to obtain action information, the action information being repositioning the current vehicle to another current location or completing a current ride order by the current vehicle. Block 415 comprises transmitting the generated action information to the computing device to cause the current vehicle to reposition to the another current location, stay at the current location, or accept the current ride order by proceeding to a pick-up location of the current ride order. The MDP model is solved based on a plurality of historical or simulated vehicle trips under a policy of maximizing a cumulative reward for a hypothetical vehicle completing the historical or simulated vehicle trips. The MDP model discretizes a region into repeating zones and a time period into time slots. Each state of the MDP model comprises: a time represented by a time lot index, a location represented by a repeating zone index, and a number of available orders nearby in a list, the available orders nearby represented by repeating zone indices of destinations of the available orders nearby. Each action of the MDP model comprises: completing one of the available orders nearby from the list, repositioning to another location, or staying at the location. If the hypothetical vehicle completes one of the available orders nearby from the list, the hypothetical vehicle gets a fare for completing the one available order nearby as the reward, and the state transitions to a next state comprising: a next time corresponding to completion of the one available order nearby, a next location corresponding a destination of the one available order nearby, and a next number of available orders nearby in a next list corresponding the next location. If the hypothetical vehicle repositions to the another location, the hypothetical vehicle gets no reward, and the state transitions to a next state comprising: a next time corresponding to reaching the another location, the another location, and a next number of available orders nearby in a next list corresponding the another location. If the hypothetical vehicle stays at the location, the hypothetical vehicle gets no reward, and the state transitions to a next state comprising: the time, the location, and the number of available orders nearby in the list.

In some embodiments, for solving the MDP model, the location and pick-up locations of the available orders nearby are in a same repeating zone. For application of the solved MDP model, the current location and a pick-up location of the current ride order are within a same repeating zone.

In some embodiments, for solving the MDP model, all orders with pick-up locations in a repeating zone corresponding to the location are divided averagely and randomly among all vehicles in the repeating zone corresponding to the location to obtain the number of available orders nearby for the hypothetical vehicle. For application of the solved MDP model, all current orders with pick-up locations in a repeating zone corresponding to the current location are divided averagely and randomly among all current vehicles in the repeating zone corresponding to the current location to obtain the current number of available orders nearby for the current vehicle.

In some embodiments, for solving the MDP model, the number of available orders nearby for the hypothetical vehicle is a ceiling function of a division of the all orders with pick-up locations in the repeating zone corresponding to the location by the all vehicles in the repeating zone corresponding to the location. For example, the number of available orders nearby may be five. For application of the solved MDP model, the current number of available orders nearby for the current vehicle is a ceiling function of a division of the all current orders with pick-up locations in the repeating zone corresponding to the current location by the all current vehicles in the repeating zone corresponding to the current location to obtain. For example, the number of available orders nearby may be five.

In some embodiments, solving the MDP model based on the plurality of historical or simulated vehicle trips comprises: obtaining data for each of the historical vehicle trips, the data comprising: a historical pick-up time, a historical pick-up location, a historical drop-off time, and a historical drop-off location, training a random forest classifier with the historical pick-up time, the historical pick-up location, and the historical drop-off location as training data and with the historical drop-off time minus the historical pick-up time as label to build a cruise time estimator, the cruise time estimator estimating a time to reach a destination based on the time, the location, and the destination of the one available order nearby, or based on the time, the location, and the anther location, and applying the cruise time estimator in each state transition to determine the next time corresponding to completion of the one available order nearby or to determine the next time corresponding to reaching the another location.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
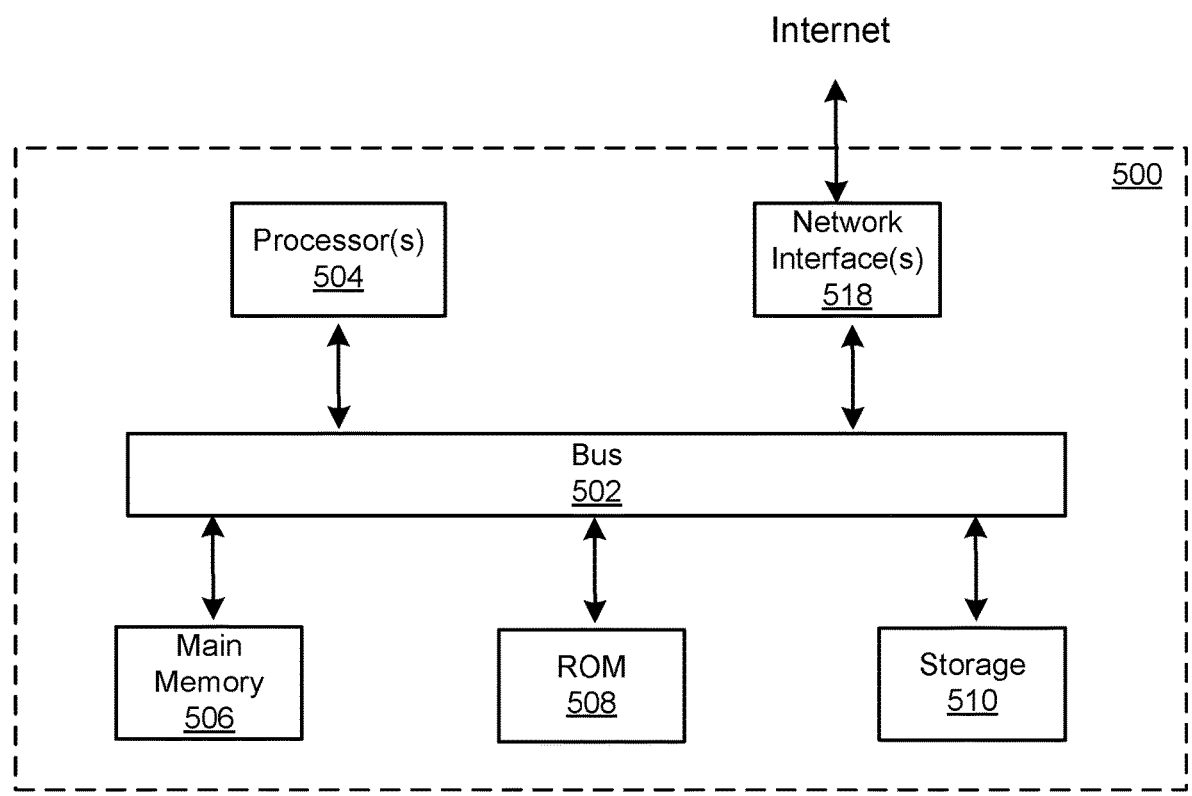
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may correspond to the system 102 or 103 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the operations, methods, and processes described herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor (s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to a media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines.

In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A computer-implemented method for ride order dispatching, comprising:
    obtaining a current location of a current vehicle from a computing device associated with the current vehicle;
    obtaining a current list of available orders based on the current location;
    feeding the current location, the current list of available orders, and a current time to a trained Markov Decision Process (MDP) model to obtain action information, the action information comprising: staying at the current location, repositioning the current vehicle to another current location, or completing a current ride order by the current vehicle; and
    transmitting the action information to the computing device associated with the current vehicle, wherein the current vehicle is configured to stay or relocate based on the action information, wherein:
        the MDP model is trained based on a plurality of historical or simulated vehicle trips under a policy of maximizing a cumulative reward for a training vehicle completing the historical or simulated vehicle trips,
        the MDP model discretizes a region into repeating zones and a time period into time slots,
        each state of the MDP model comprises: a time represented by a time lot index, a location represented by a repeating zone index, and a list of available orders represented by repeating zone indices of destinations of the available orders,
        each action of the MDP model comprises: completing one of the available orders from the list, repositioning to another location, or staying at the location,
        if the training vehicle completes one of the available orders from the list, the training vehicle gets a fare for completing the one available order as the reward, and the state transitions to a next state comprising: a next time corresponding to completion of the one available order, a next location corresponding a destination of the one available order, and a next list of available orders corresponding the next location,
        if the training vehicle repositions to the another location, the training vehicle gets no reward, and the state transitions to a next state comprising: a next time corresponding to reaching the another location, the another location, and a next list of available orders corresponding the another location, and
        if the training vehicle stays at the location, the training vehicle gets no reward, and the state transitions to a next state comprising: the time, the location, and the list of available orders.

2. The method of claim 1, wherein:
    for training the MDP model, the location and pick-up locations of the available orders are in a same repeating zone; and
    for application of the trained MDP model, the current location and a pick-up location of the current ride order are within a same repeating zone.

3. The method of claim 1, wherein:
    for training the MDP model, all orders with pick-up locations in a repeating zone corresponding to the location are divided averagely and randomly among all vehicles in the repeating zone corresponding to the location to obtain the list of available orders for the training vehicle; and
    for application of the trained MDP model, all current orders with pick-up locations in a repeating zone corresponding to the current location are divided averagely and randomly among all current vehicles in the repeating zone corresponding to the current location to obtain the current list of available orders for the current vehicle.

4. The method of claim 3, wherein:
    for training the MDP model, the list of available orders for the training vehicle is a ceiling function of a division of the all orders with pick-up locations in the repeating zone corresponding to the location by the all vehicles in the repeating zone corresponding to the location; and
    for application of the trained MDP model, the current list of available orders for the current vehicle is a ceiling function of a division of the all current orders with pick-up locations in the repeating zone corresponding to the current location by the all current vehicles in the repeating zone corresponding to the current location to obtain.

5. A system comprising a processor and a non-transitory computer-readable storage medium storing instructions that, when executed by the processor, cause the system to perform a method for ride order dispatching, the method comprising:
    obtaining a current location of a current vehicle from a computing device associated with the current vehicle;
    obtaining a current list of available orders based on the current location;
    feeding the current location, the current list of available orders, and a current time to a trained Markov Decision Process (MDP) model to obtain action information, the action information comprising: staying at the current location, repositioning the current vehicle to another current location, or completing a current ride order by the current vehicle; and
    transmitting the action information to the computing device associated with the current vehicle, wherein the current vehicle is configured to stay or relocate based on the action information, wherein:
        the MDP model is trained based on a plurality of historical or simulated vehicle trips under a policy of maximizing a cumulative reward for a training vehicle completing the historical or simulated vehicle trips,
        the MDP model discretizes a region into repeating zones and a time period into time slots,
        each state of the MDP model comprises: a time represented by a time lot index, a location represented by a repeating zone index, and a list of available orders represented by repeating zone indices of destinations of the available orders, each action of the MDP model comprises: completing one of the available orders from the list, repositioning to another location, or staying at the location, if the training vehicle completes one of the available orders from the list, the training vehicle gets a fare for completing the one available order as the reward, and the state transitions to a next state comprising: a next time corresponding to completion of the one available order, a next location corresponding a destination of the one available order, and a next list of available orders corresponding the next location, if the training vehicle repositions to the another location, the training vehicle gets no reward, and the state transitions to a next state comprising: a next time corresponding to reaching the another location, the another location, and a next list of available orders corresponding the another location, and if the training vehicle stays at the location, the training vehicle gets no reward, and the state transitions to a next state comprising: the time, the location, and the list of available orders.

6. The system of claim 5, wherein:

for training the MDP model, the location and pick-up locations of the available orders are in a same repeating zone; and for application of the trained MDP model, the current location and a pick-up location of the current ride order are within a same repeating zone.

7. The system of claim 5, wherein:

for training the MDP model, all orders with pick-up locations in a repeating zone corresponding to the location are divided averagely and randomly among all vehicles in the repeating zone corresponding to the location to obtain the list of available orders for the training vehicle; and for application of the trained MDP model, all current orders with pick-up locations in a repeating zone corresponding to the current location are divided averagely and randomly among all current vehicles in the repeating zone corresponding to the current location to obtain the current list of available orders for the current vehicle.

8. The system of claim 7, wherein:

for training the MDP model, the list of available orders for the training vehicle is a ceiling function of a division of the all orders with pick-up locations in the repeating zone corresponding to the location by the all vehicles in the repeating zone corresponding to the location; and for application of the trained MDP model, the current list of available orders for the current vehicle is a ceiling function of a division of the all current orders with pick-up locations in the repeating zone corresponding to the current location by the all current vehicles in the repeating zone corresponding to the current location to obtain.

9. Non-transitory computer-readable storage medium storing instructions that, when executed by one or more processors, cause the one or more processors to perform operations comprising:

obtaining a current location of a current vehicle from a computing device associated with the current vehicle;

obtaining a current list of available orders based on the current location;

feeding the current location, the current list of available orders, and a current time to a trained Markov Decision Process (MDP) model to obtain action information, the action information comprising: staying at the current location, repositioning the current vehicle to another current location, or completing a current ride order by the current vehicle; and transmitting the action information to the computing device associated with the current vehicle, wherein the current vehicle is configured to stay or relocate based on the action information, wherein:

the MDP model is trained based on a plurality of historical or simulated vehicle trips under a policy of maximizing a cumulative reward for a training vehicle completing the historical or simulated vehicle trips, the MDP model discretizes a region into repeating zones and a time period into time slots, each state of the MDP model comprises: a time represented by a time lot index, a location represented by a repeating zone index, and a list of available orders represented by repeating zone indices of destinations of the available orders, each action of the MDP model comprises: completing one of the available orders from the list, repositioning to another location, or staying at the location, if the training vehicle completes one of the available orders from the list, the training vehicle gets a fare for completing the one available order as the reward, and the state transitions to a next state comprising: a next time corresponding to completion of the one available order, a next location corresponding a destination of the one available order, and a next list of available orders corresponding the next location, if the training vehicle repositions to the another location, the training vehicle gets no reward, and the state transitions to a next state comprising: a next time corresponding to reaching the another location, the another location, and a next list of available orders corresponding the another location, and if the training vehicle stays at the location, the training vehicle gets no reward, and the state transitions to a next state comprising: the time, the location, and the list of available orders.

10. The non-transitory computer-readable storage medium of claim 9, wherein:

for training the MDP model, all orders with pick-up locations in a repeating zone corresponding to the location are divided averagely and randomly among all vehicles in the repeating zone corresponding to the location to obtain the list of available orders for the training vehicle; and for application of the trained MDP model, all current orders with pick-up locations in a repeating zone corresponding to the current location are divided averagely and randomly among all current vehicles in the repeating zone corresponding to the current location to obtain the current list of available orders for the current vehicle.

11. The non-transitory computer-readable storage medium of claim 10, wherein:

for training the MDP model, the list of available orders for the training vehicle is a ceiling function of a division of the all orders with pick-up locations in the repeating zone corresponding to the location by the all vehicles in the repeating zone corresponding to the location; and for application of the trained MDP model, the current list of available orders for the current vehicle is a ceiling function of a division of the all current orders with pick-up locations in the repeating zone corresponding to the current location by the all current vehicles in the repeating zone corresponding to the current location to obtain.

* * * * *